(12) United States Patent
Aftanas

(10) Patent No.: US 8,985,414 B2
(45) Date of Patent: Mar. 24, 2015

(54) ILLUMINATED VEHICLE ARTICLE CARRIER

(75) Inventor: Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 310 days.

(21) Appl. No.: 13/076,838

(22) Filed: Mar. 31, 2011

(65) Prior Publication Data

US 2011/0240695 A1 Oct. 6, 2011

Related U.S. Application Data

(60) Provisional application No. 61/320,059, filed on Apr. 1, 2010.

(51) Int. Cl.
*B60R 9/04* (2006.01)
*B60Q 1/26* (2006.01)
*B60R 3/00* (2006.01)
*B60R 19/50* (2006.01)

(52) U.S. Cl.
CPC ............... *B60R 9/04* (2013.01); *B60Q 1/2611* (2013.01); *B60Q 1/2661* (2013.01); *B60Q 1/2696* (2013.01); *B60R 3/002* (2013.01); *B60R 19/50* (2013.01)
USPC ............ 224/326; 224/309; 224/557; 362/493

(58) Field of Classification Search
USPC ......... 224/309, 311, 319, 325, 326, 556, 557, 224/544; 296/210; 362/493, 365, 368
See application file for complete search history.

(56) References Cited

U.S. PATENT DOCUMENTS

| 3,887,803 | A | * | 6/1975 | Savage, Jr. ..................... 362/363 |
| 4,269,339 | A |   | 5/1981 | Bott |
| 4,426,028 | A | * | 1/1984 | Bott ............................... 224/325 |
| 4,712,163 | A | * | 12/1987 | Oxley ............................. 362/29 |
| 4,722,030 | A |   | 1/1988 | Bowden |
| 4,800,470 | A |   | 1/1989 | Correll et al. |
| 5,066,889 | A | * | 11/1991 | Edwards ........................ 313/512 |
| 5,171,083 | A |   | 12/1992 | Rich |
| 5,495,400 | A |   | 2/1996 | Currie |
| 5,848,839 | A | * | 12/1998 | Savage, Jr. ..................... 362/267 |
| 6,069,447 | A | * | 5/2000 | Vilanilam et al. ............... 315/56 |
| 6,114,954 | A | * | 9/2000 | Palett et al. .................. 340/294 |
| 6,550,414 | B1 |   | 4/2003 | Correll et al. |
| 7,081,810 | B2 |   | 7/2006 | Henderson et al. |
| 7,377,674 | B2 |   | 5/2008 | Klinkman et al. |
| 7,549,773 | B2 | * | 6/2009 | Lim ............................... 362/294 |
| 2005/0212249 | A1 |   | 9/2005 | Lopez |
| 2012/0031939 | A1 |   | 2/2012 | Jutila et al. |

* cited by examiner

*Primary Examiner* — Brian D Nash
*Assistant Examiner* — Corey Skurdal
(74) *Attorney, Agent, or Firm* — Harness, Dickey & Pierce, P.L.C.

(57) ABSTRACT

A vehicle article carrier system for use on an outer body surface of a vehicle, where the system may make use of a light emitting diode (LED) and a pair of support rails assemblies secured parallel to one another along a major longitudinal axis of the vehicle. At least one of the support rail assemblies may have a light pipe in optical communication with the LED. The light pipe may operate to radiate light generated by the LED outwardly from the support rail assembly along the length of the light pipe to thus illuminate a portion of the vehicle.

10 Claims, 10 Drawing Sheets

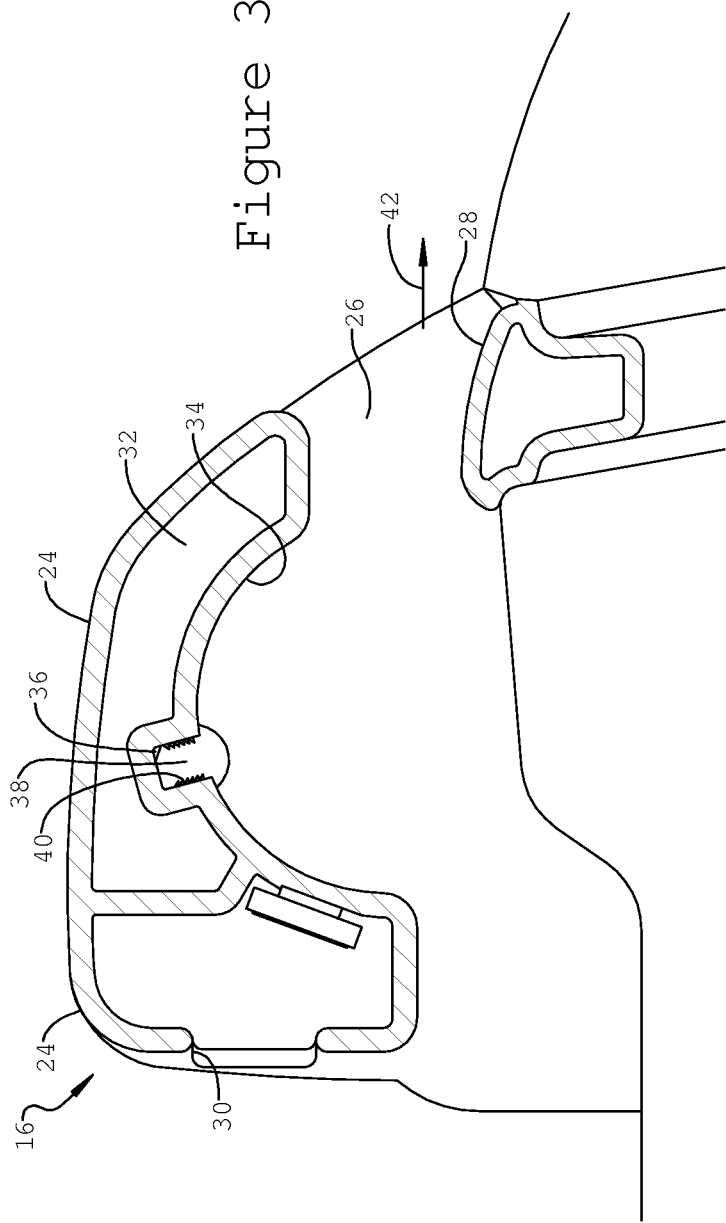
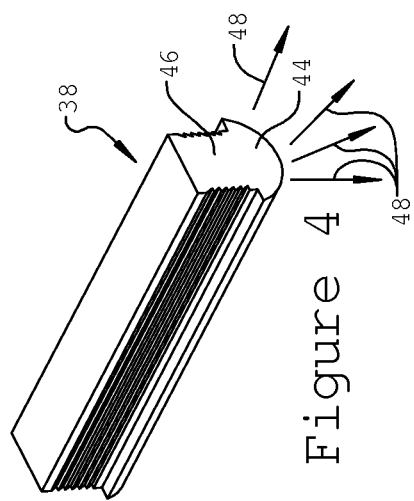

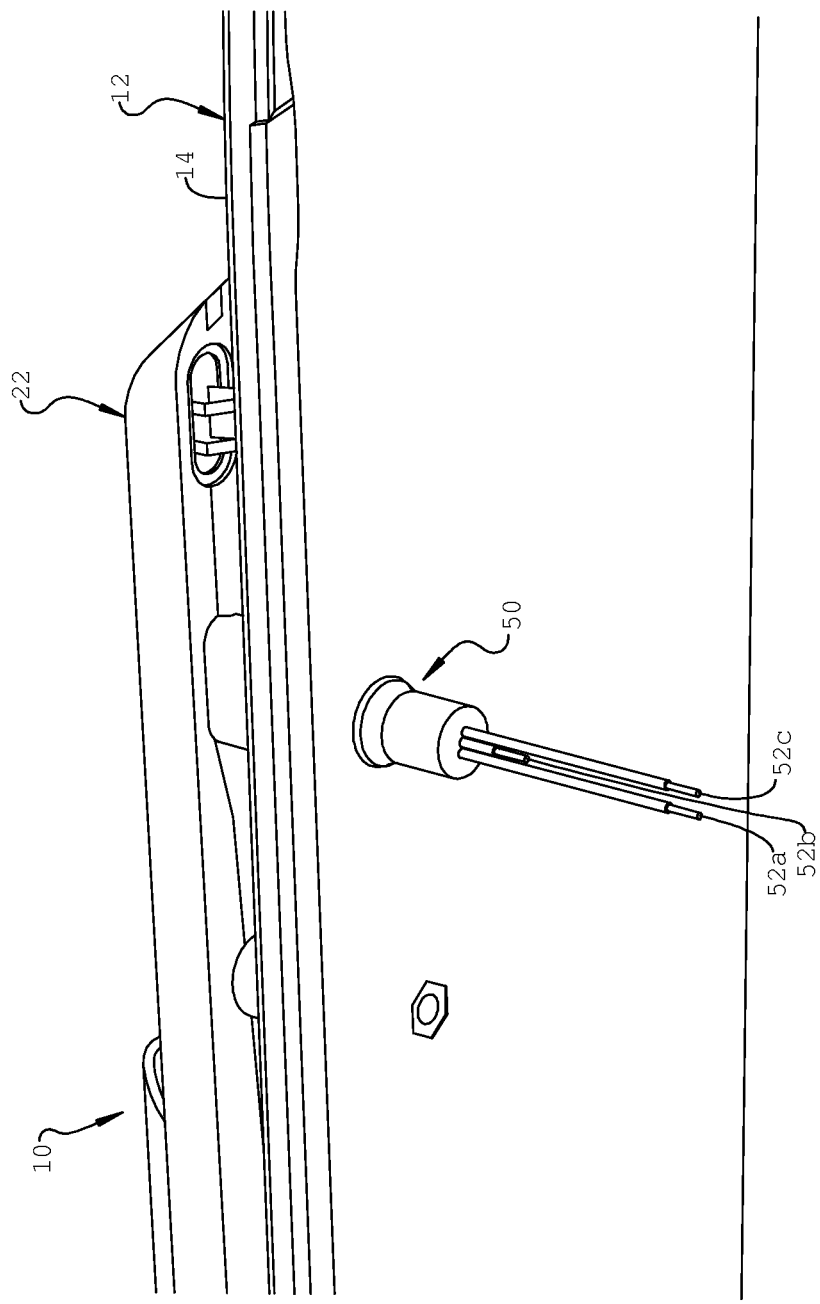

ILLUMINATED VEHICLE ARTICLE CARRIER

CROSS-REFERENCE TO RELATED APPLICATIONS

This application claims the benefit of U.S. Provisional Application No. 61/320,059, filed on Apr. 1, 2010. The entire disclosure of the above application is incorporated herein by reference.

FIELD

The present disclosure relates to vehicle article carrier systems, and more particularly to a vehicle article carrier system that includes one or more light bars that provide illumination to areas of a vehicle in the vicinity of the vehicle article carrier system.

BACKGROUND

The statements in this section merely provide background information related to the present disclosure and may not constitute prior art.

Vehicle article carriers are used in a wide variety of applications to support various types of articles thereon, and above an outer body surface of a vehicle. Typically a vehicle carrier article will include a pair of support rails that are secured to the outer body surface of the vehicle parallel to one another, and such that they extend along the longitudinal axis of the vehicle. One or more cross bars are typically secured to the support rails to extend perpendicularly between the support rails. The cross bars are used to support articles thereon above the outer body surface.

Some previous vehicle article carrier systems have employed an integrated incandescent light for the purpose of providing additional illumination to help make the vehicle even more visible during night time driving. However, such systems have required electrical conductors (i.e., wires) to be run within portions of the vehicle article carrier, and more typically within the support rails, to the locations where the incandescent bulbs are located. As will be appreciated, this adds significant complexity to the construction of the vehicle article carrier system, as well as adding to its overall cost. It also necessitates some form of electrical connector for making the electrical connection between the electrical wiring of the vehicle article carrier and the vehicle wiring that is providing electrical power to the light(s) in the vehicle article carrier surface. The use of an electrical connection can have drawbacks if moisture should enter the electrical connector. Such a condition could potentially result in complete malfunctioning or intermittent malfunctioning of the light(s) employed in the vehicle article carrier system. Still further, the use of an incandescent bulb, which will typically have a relatively limited lifespan (in terms of hours), means that the incandescent bulb will need to be integrated into the vehicle article carrier in such a way that replacement of the bulb can be made, and preferably without the need to remove the support rails from the outer body surface or otherwise disassemble the subcomponents of the vehicle article carrier system. And as should be well understood, incandescent bulbs can be somewhat susceptible to breakage due to vibration. In a motor vehicle application, especially with vehicles such as vans and trucks that may be required to be driven "off-road" by contractors or like individuals going to a construction site, potentially very significant vibration may be encountered while driving.

In view of the foregoing, it will be appreciated that the use of incandescent bulbs and conventional wiring in a vehicle article carrier system gives rise to a number of significant challenges relating to potential reliability of the electrical components of the system, and potentially dealing with repair and/or maintenance of such a system.

SUMMARY

In one aspect the present disclosure relates to a vehicle article carrier system for use on an outer body surface of a vehicle. The system may comprise a light emitting diode (LED) and a pair of support rail assemblies secured parallel to one another along a major longitudinal axis of the vehicle. At least one of the support rail assemblies may include a light pipe in optical communication with the LED. The light pipe may operate to radiate light generated by the LED outwardly from the support rail assembly along the length of the light pipe to thus illuminate a portion of the vehicle.

In another aspect the present disclosure relates to a vehicle article carrier system for use on an outer body surface of a vehicle. The system may comprise a light emitting diode (LED) disposed within the outer body surface. A pair of support rails assemblies may be included that are secured parallel to one another along a major longitudinal axis of the vehicle. Each support rail assembly may include a front support foot, a rear support foot, and a support rail extending between the front support foot and the rear support foot. At least one of the support rail assemblies may include a light pipe in optical communication with the LED. The light pipe may be arranged along and parallel to a longitudinal axis of the support rail, and exposed along a surface portion of the support rail, to radiate light therefrom and to illuminate a portion of the vehicle. At least one cross bar may be included which is supported at its opposing ends from the pair of support rail assemblies. The cross bar may be adapted to support articles thereon above the outer body surface of the vehicle.

In another aspect the present disclosure relates to a vehicle accessory component adapted for use on a vehicle. The accessory component may include an elongated component adapted to be supported adjacent an outer body surface of a vehicle, and a flexible light pipe. The flexible light pipe may have opposing ends and may be secured to the elongated component adjacent a surface of the elongated component. The flexible light pipe may be adapted to radiate light outwardly therefrom in response to an optical signal supplied at one of the opposing ends of the light pipe.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a cross sectional end view of the support rail of FIG. 2 taken along section line 3-3 in FIG. 2, illustrating a light pipe that is contained within a channel of the support rail, where the light pipe generates a quantity of light to assist in lighting the sides of the vehicle;

FIG. 4 is a perspective view of a portion of the light pipe;

FIG. 5 is a perspective view of a portion of the support rail of FIG. 2 taken from underneath the outer body surface of the vehicle, and showing the LED housing and its associated conductors secured within a hole in the outer body vehicle surface;

DETAILED DESCRIPTION

The following description is merely exemplary in nature and is not intended to limit the present disclosure, application, or uses.

Figure 1:
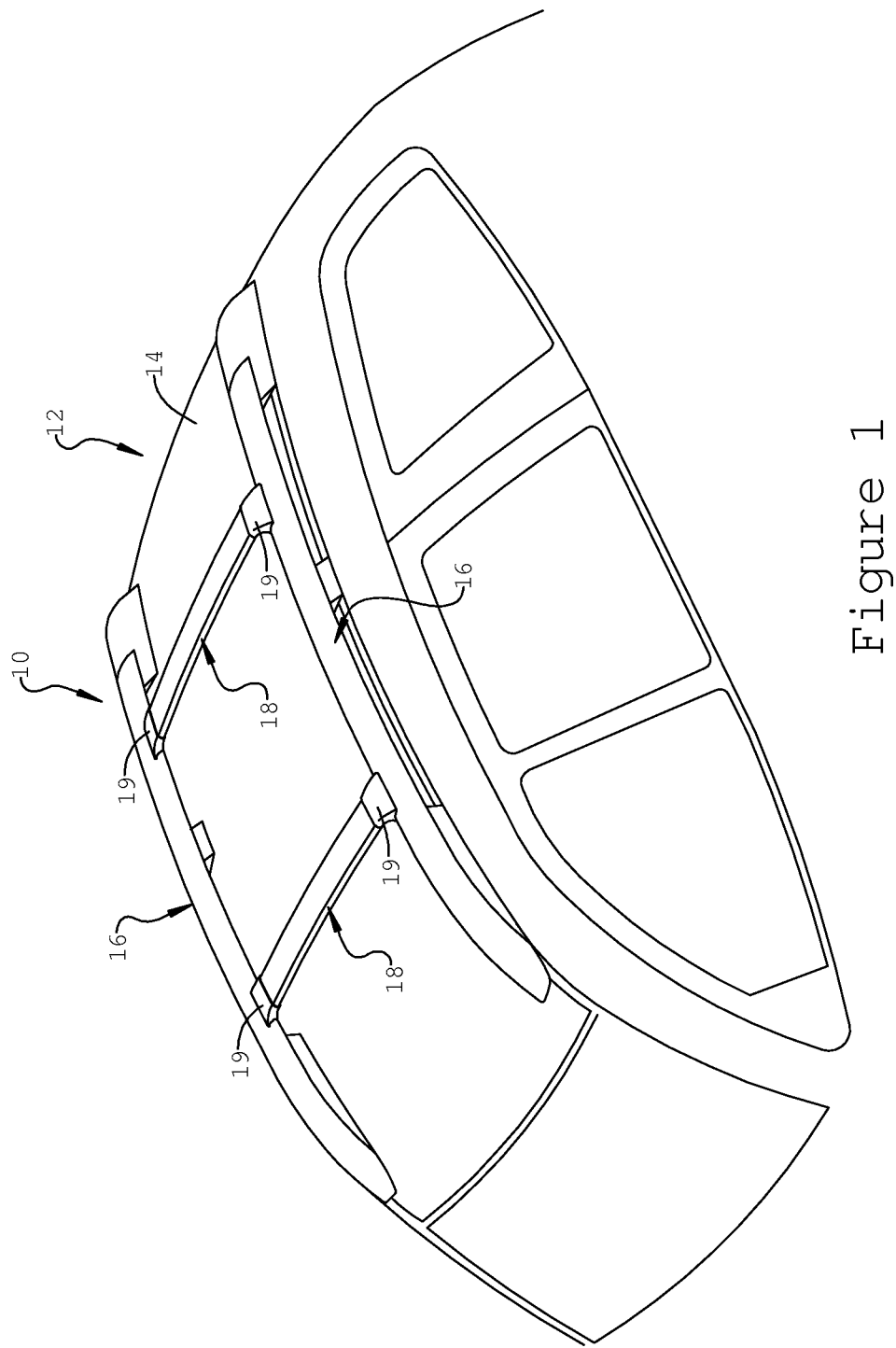
FIG. 1 shows a perspective view of one embodiment of a vehicle article carrier system in accordance with the present disclosure, with the system being secured to an outer body surface of a passenger motor vehicle.

Referring to FIG. 1 a motor vehicle 12 is shown in which one embodiment of a vehicle article carrier system 10 in accordance with the present disclosure is secured to the motor vehicle 12. The vehicle article carrier system 10 is secured to an outer body surface 14 of the motor vehicle 12 and includes a pair of support rail assemblies 16 secured parallel to one another to extend along a major longitudinal axis of the motor vehicle 12. A pair of cross bars 18 is supported by the support rail assemblies 16 such that the cross bars 18 extend perpendicularly across between the support rail assemblies 16. Each of the cross bars 18 may incorporate an end support 19 at both ends thereof that may be secured to the support rail assemblies 16. While two cross bars 18 are shown, it will be appreciated that a greater or lesser number of cross bars may be employed. One or both of the cross bars 18 may be adjustably positionable on the support rail assemblies 16 to better configure them to support variously sized articles thereon above the outer body surface 14. The vehicle article carrier system 10 may be used on sedans, wagons, cross overs, sport utility vehicles, and possibly even over the bed of a pickup truck with possibly only minor modifications. Accordingly, the vehicle article carrier system 10 is not limited to use with only one specific type of vehicle.

Figure 2:
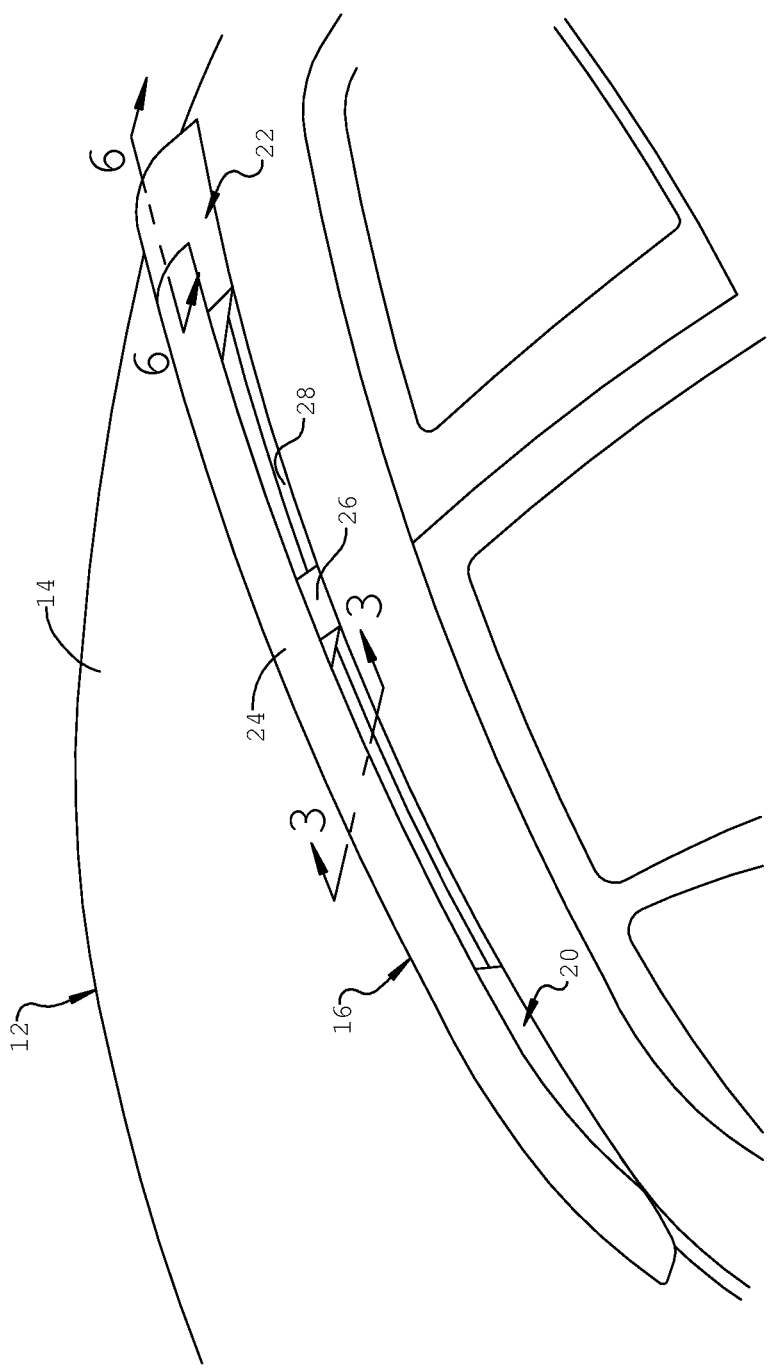
FIG. 2 is an enlarged perspective view of just one support rail of the system of FIG. 1 secured to the outer body surface of the vehicle.

Referring to FIG. 2 an enlarged illustration of one of the support rail assemblies 16 is provided. In this example both of the support rail assemblies 16 are of identical construction, so the following description of the construction of one of the support rail assemblies 16 shown in FIG. 2 will apply equally to the construction of the other one of the support rail assemblies 16. The support rail assembly 16 includes a front support foot 20, a rear support foot 22 and a support rail 24 that extends between the front support foot 20 and the rear support foot 22. An optional center support foot 26 is provided in this implementation. A decorative molding 28 is shown positioned in the ditch channel of the outer body surface 14.

Referring to FIG. 3, the cross-sectional construction of the support rail 24 is shown. The support rail 24 has a longitudinally extending, sideways opening channel 30 to which the end supports 19 at one end of each of the cross bars 18 may be secured via any suitable clamping-like structure. Suitable end supports and cross bars are disclosed in U.S. Pat. Nos. 7,198,184 and 6,779,696, as well as U.S. Patent Publication 2007/0151188 owned by JAC Products, Inc., and the disclosure of each of these documents is hereby incorporated by reference into the present disclosure.

The support rail 24 may also include a hollow section 32 and a lower surface that forms a semi-circular shaped undersurface portion 34. A channel 36 may be formed to extend longitudinally along the support rail 24 in which a light pipe 38 is disposed. The light pipe 38 may thus extend parallel to a longitudinal axis of the support rail 24 and along a major portion of the longitudinal length of the support rail 24. One form of light pipe 38 that is well suited for use in the present vehicle article carrier system 10 is commercially available from the 3M Corporation of St. Paul, Minn. However, virtually any type of fiber optic type cable is potentially useable with the support rail 24 providing that it can receive an optical input signal from a light emitting diode (LED) and radiate an acceptable volume of light. As will be explained in greater detail in the following paragraphs, the light pipe 38 is similar to a fiber optic cable and channels light received from an LED. In one embodiment the light pipe 38 may be retained in the channel 36 by suitable teeth or serrations 40 that are integrally formed in opposing surface portions of the channel 36 during the manufacture of the support rail 24. Alternatively, suitable fastening clips or other like structure could be used to hold the light pipe 38 within the channel 36. The light pipe 38 operates to radiate light along its length, with a substantial portion of the light being directed toward the outer body 14 surface of the vehicle 12. The semi-circular shaped undersurface portion 34 and the decorative molding strip 28 may also help to reflect light towards the side of the vehicle 12 in the direction of arrow 42. The percentage of light reflected may be dependent in part on the color of the semi-circular undersurface portion 34, the precise shape of the semi-circular undersurface portion 34, the color of the outer body surface 14, and the color of the decorative molding 28. Optionally, a reflective surface coating may be applied to the semi-circular undersurface portion 34 and/or its shape tailored to reflect the radiated light most efficiently in a desired direction.

A representative portion of the light pipe 38 is shown in FIG. 4. The light pipe 38 has a head portion 44 and an integrally formed neck portion 46. The width and depth of the neck portion 46 may be selected so that the neck portion may be press fit into the channel 36 of the support rail 24 and held therein without any external fastening clips or like implement. The head portion 44 may vary in its dimensions and radius of curvature to meet the needs of a specific application and/or to help direct the radiated light in a particular direction.

The light pipe 38 shown may further include a plurality of laterally, closely spaced teeth 38a that are believed to help disperse light travelling down the light pipe 38 in a direction normal to the longitudinal axis of the light pipe, and furthermore in a direction away from the neck portion 46.

Referring to FIG. 5, the rear support foot 22 of the support rail 16 is shown positioned over an LED housing 50 which houses an LED (not visible in FIG. 5) therein. A plurality of electrical conductors 52a, 52b and 52c extend from the LED housing 50 that may be connected to suitable conductors of a wiring harness of the vehicle 12. The conductors 52a, 52b and 52c may be used to allow control over the operation of the LED in accordance with use of a key FOB of the vehicle, a turn signal of the vehicle, or possibly even the headlights or daytime running lights of the vehicle, or possibly when the vehicle's lights are placed in the emergency flashing condition. Thus, the LED can be controlled to turn on for a controlled time when an operator presses an "UNLOCK" button on the vehicle's key FOB. Alternatively, the LED can be turned on by a suitable electrical signal when the vehicle headlights are turned on, when a brake pedal of the vehicle 12 is depressed, or whenever the daytime running lights of the vehicle are turned on, presuming that the vehicle incorporates daytime running lights. It will be appreciated that the ON/OFF operation of the LED could be controlled in virtually any fashion assuming suitable electrical power and control signals are applied thereto.

Figure 6:
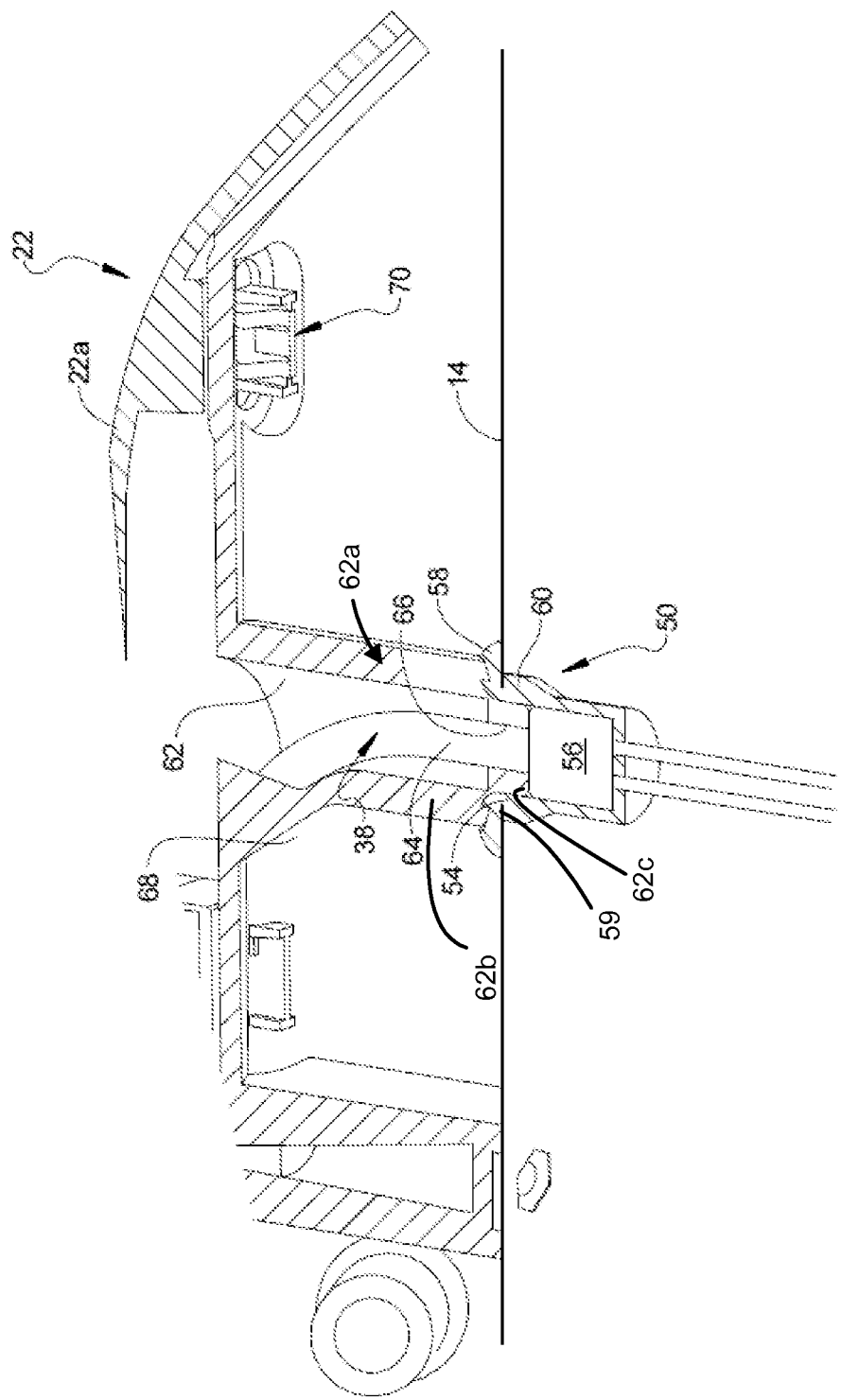
FIG. 6 is a cross sectional view of a portion of one rear support foot taken in accordance with section line 6-6 in FIG. 2 illustrating the abutting coupling of an input end of the light pipe with the LED housing, and further illustrating how the LED housing is retained within the hole in the outer body surface of the vehicle.
Figure 7:
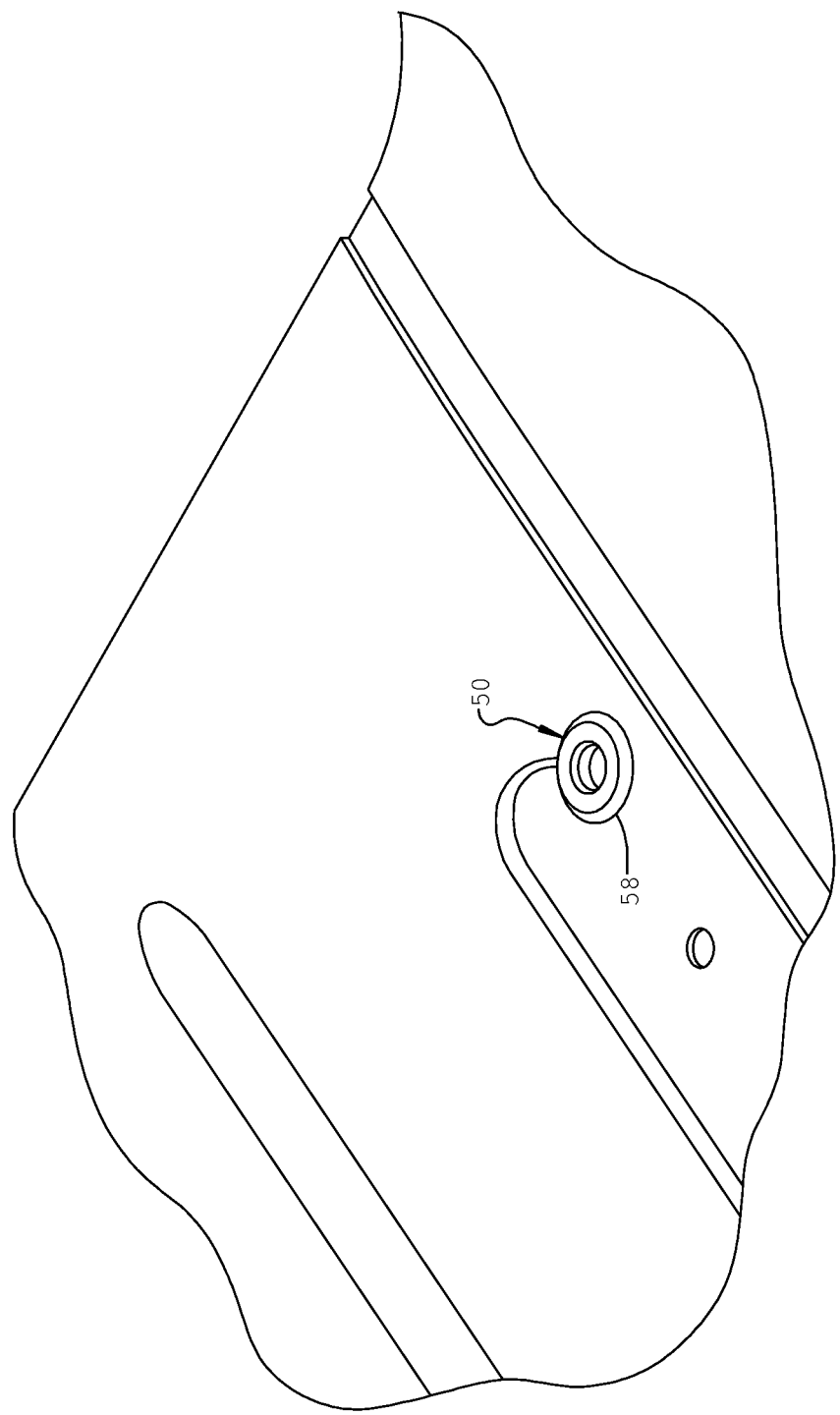
FIG. 7 is a perspective view looking down onto the outer body surface of the vehicle without the support rail of FIG. 2 attached, to illustrate the LED housing and the light that is projected upwardly through the hole in the outer body surface.

With reference to FIG. 6, the LED housing 50 can be seen in greater detail installed within an opening 54 in the outer body surface 14 of the vehicle 12. The LED housing 50 has a cavity 50a which houses at least one LED 56 therein and may be formed from a relatively stiff rubber or a combination of plastic or metal, with a rubber coating thereover. The LED housing 50 may preferably incorporate a flange 58 and a lip 60 that form a narrow circumferential channel 59 there between. The LED housing 50 may have a diameter that is selected to be just slightly smaller than the diameter of the opening 54, and may be inserted through the opening 54 from an exterior side of the outer body surface 14. When inserted into the opening 54 in this manner the lip 60 is compressed as it passes through the opening 54, and the LED housing 50 then engages the opening 54 so that the channel 59 of the LED housing 50 is captured in the opening 54. The LED housing 50 is shown in FIG. 7 without the support rail 16 positioned on the outer body surface 14. It will be appreciated that while a single LED 56 is illustrated in FIG. 6 within the LED housing 50, that two or more LEDs could be housed therein depending on the size of the housing and the size of the opening 54. Alternatively the LED housing 50 may form an enclosure for housing a circuit board with one or more LEDs, where the housing is secured by any suitable means over the opening 54. Thus it will be appreciated that the LED housing 50 may take a wide variety of shapes and sizes as needed to meet the needs of a specific application.

Figure 8:
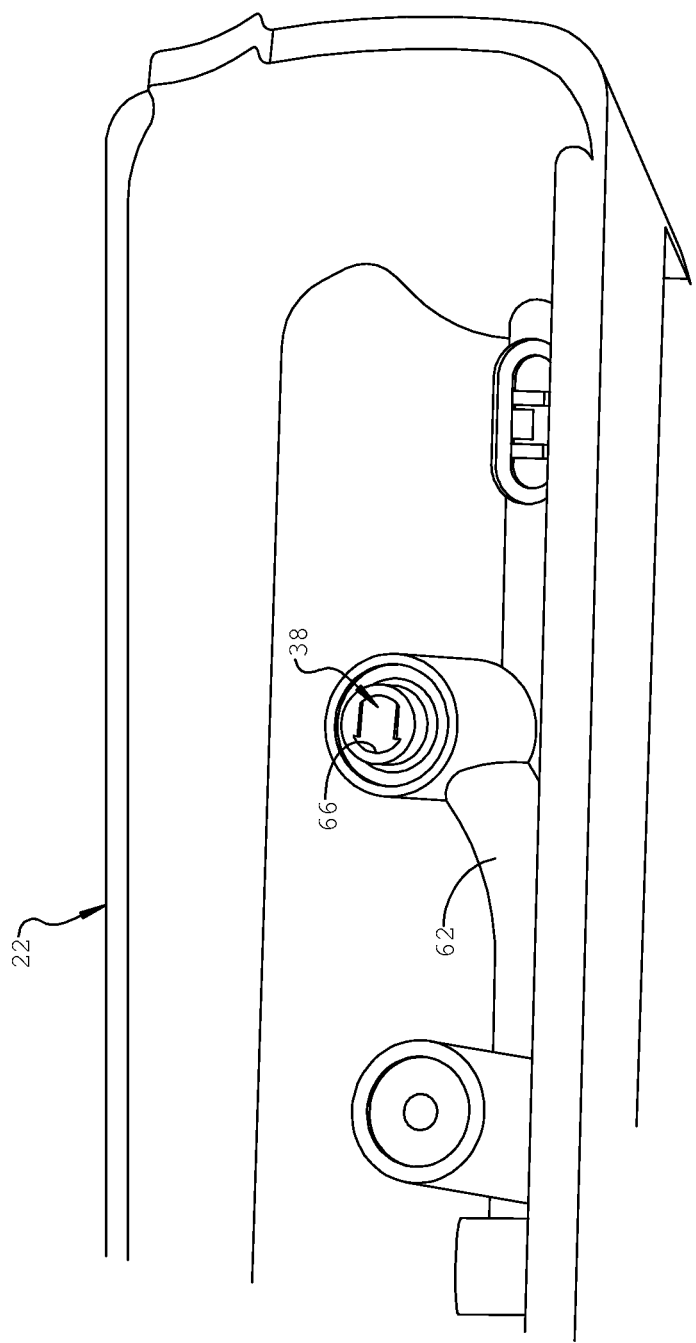
FIG. 8 is a perspective view of the undersurface of a portion of the rear support foot portion of the support rail of FIG. 2 illustrating how the input end of the light pipe is supported in a boss portion within the rear support foot portion.
Figure 9:
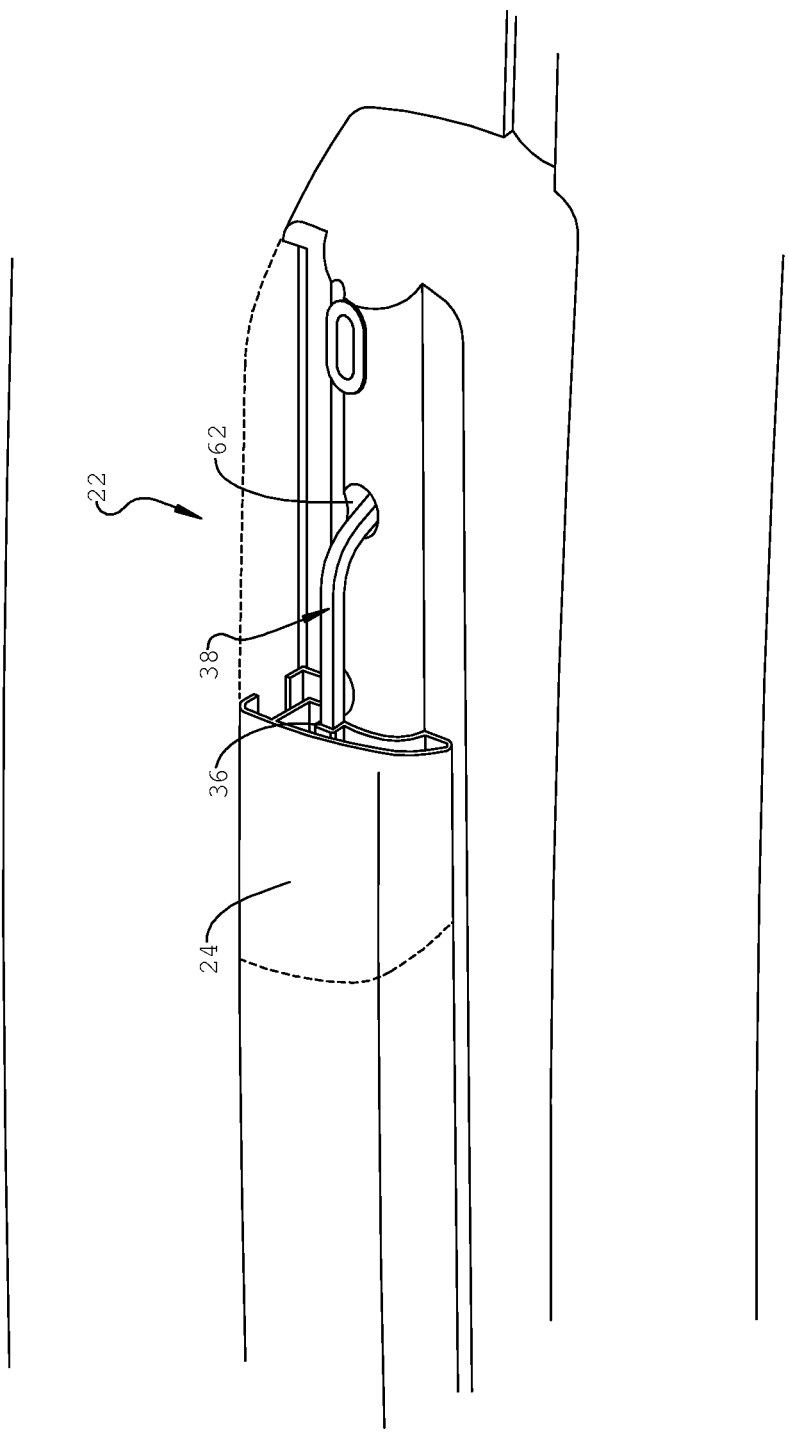
FIG. 9 is a partial cross sectional view of the rear support foot used to support the support rail of FIG. 2, and how the light pipe passes through an opening in surface portion into the boss portion.

With further reference to FIG. 6, the rear support foot 22 may include an integrally formed, curving channel 62 that holds an input end 64 of the light pipe 38 and helps to form a 90 degree bend in the light pipe 38 as it extends through the channel 62. The curving channel is formed in part by a boss-like structure 62a having a neck 62b. The neck 62b extends such that a terminal end 62c thereof is axially aligned with and disposed at least closely adjacent to a cavity 50a in the LED housing 50, or even to extend partially within the opening cavity 50a as shown in FIG. 6. This ensures that a terminal end of the light pipe 38 is secured in axial alignment with the LED 56 in the LED housing 50. The input end 64 may extend through an opening 66 into abutting contact with the LED 56 or close to abutting contact. It is not critical that the input end 64 of the light pipe 38 actually contact the LED 56 or be perfectly concentrically aligned with the LED 56. It is sufficient for the LED 56 to transmit substantially all of its optical energy into the light pipe 38 if the input end 64 is merely closely adjacent to the LED 56. It is acceptable if the input end 64 is positioned at least within a few millimeters of contacting the LED 56, and substantially concentrically aligned with the LED 56. The channel 62 includes a curving portion 68 that provides a gradual bend to the light pipe 38 to prevent kinking it. FIG. 8 illustrates a face of the input end 64 of the light pipe 38 as it appears before the rear support foot 22 is secured to the outer body surface 14. FIG. 9 illustrates the rear support foot 22 and the support rail 24 with a portion of the light pipe 38 exposed.

It is a significant benefit of the above-described design and construction of the support rail 16 that no electrical or mechanical connectors are required to interface the input end 64 of the light pipe 38 to the LED 56. Simply positioning the face of the input end 64 of the light pipe 38 against, or closely adjacent to, the LED 56 is sufficient to couple the light from the LED into the light pipe 38. This arrangement significantly simplifies the construction of the support rail 16, expedites its attachment to the outer body surface 14 and helps to reduce the overall cost of the system 10. Moreover, since no electrical connector is required, there is no possibility that moisture or corrosion of the contacts of the electrical connector may affect the coupling of the optical signal from the LED 56 into the light pipe 38.

The support rail 16 may be assembled by positioning (e.g., press fitting) the light pipe 38 within the channel 36 of the support rail 24, and such that a predetermined length of the input end 64 is projecting from an end of the support rail 24 that will pass through the rear support foot 22. The free end (i.e., the input end 64) of the light pipe 38 is then positioned in the channel 62 of the rear support foot 22 such that the input end extends into the opening 66 (FIG. 6). The rear support foot 22 and the front support foot 20 may then be secured to the outer body surface 14 of the vehicle 12, and the support rail 24 may then be secured to the support foot portions 22 and 24 by any suitable fasteners (not shown). In one embodiment a decorative cover, such as cover 22a in FIG. 6, may be secured to the rear support foot 22 to cover the channel 62 and the area where the light pipe 38 enters the channel 36 in the support rail 24. Fastening of the decorative cover 22a may be accomplished by the use of suitable cooperating flexible tab structures 70 on the decorative cover 22a and the rear support foot 22, or by any other suitable means of attachment.

It will be appreciated that while the support rail 16 has been described as incorporating a single length of the light pipe 38, that two or more separate lengths of the light pipe 38 may be incorporated. In such an implementation, a corresponding number of LEDs 56 may be incorporated to provide an independent optical signal to each section of the light pipe 38. In some applications this may provide more uniform intensity of illumination along the full length of the component being illuminated.

Figure 10:
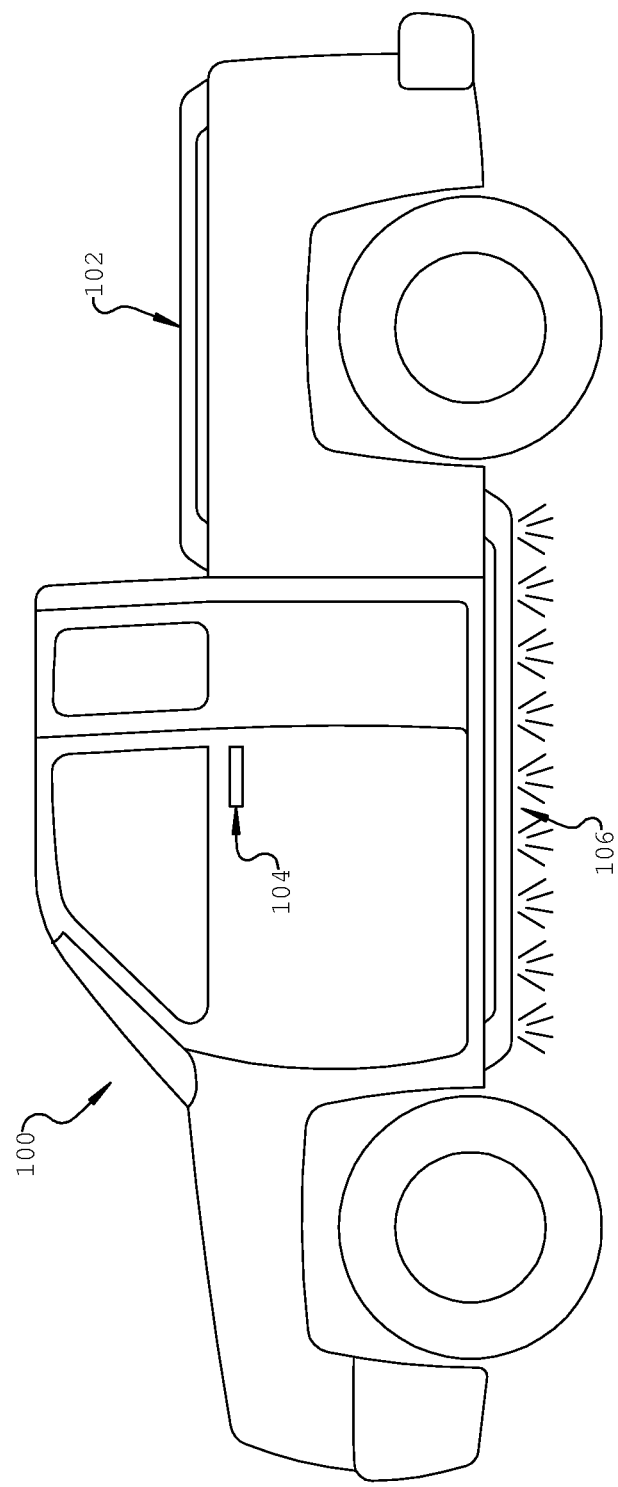
FIG. 10 is a side view of a pickup truck incorporating a grab rail, a door handle molding and a step bar that each incorporates the teachings of the present disclosure.

Referring briefly to FIG. 10, a pickup truck 100 is shown that incorporates the teachings of the vehicle article carrier system 10 in connection with a grab rail 102, a door handle molding 104 and a step bar 106. In this example each of the grab rail 102, door handle molding 104 and step bar 106 include one or more light pipes, such as light pipe 38, held within a channel such that light can be radiated outwardly from the channel to illuminate a limited area of the vehicle 100. It will also be appreciated that the light pipe 38 and the teachings related to the construction of the support rail 16 may also be applied to other vehicles such boats, personal watercraft, recreational vehicles, trailers, or any other form of vehicle where it is desired to light a limited portion of the vehicle.

Figure 11:
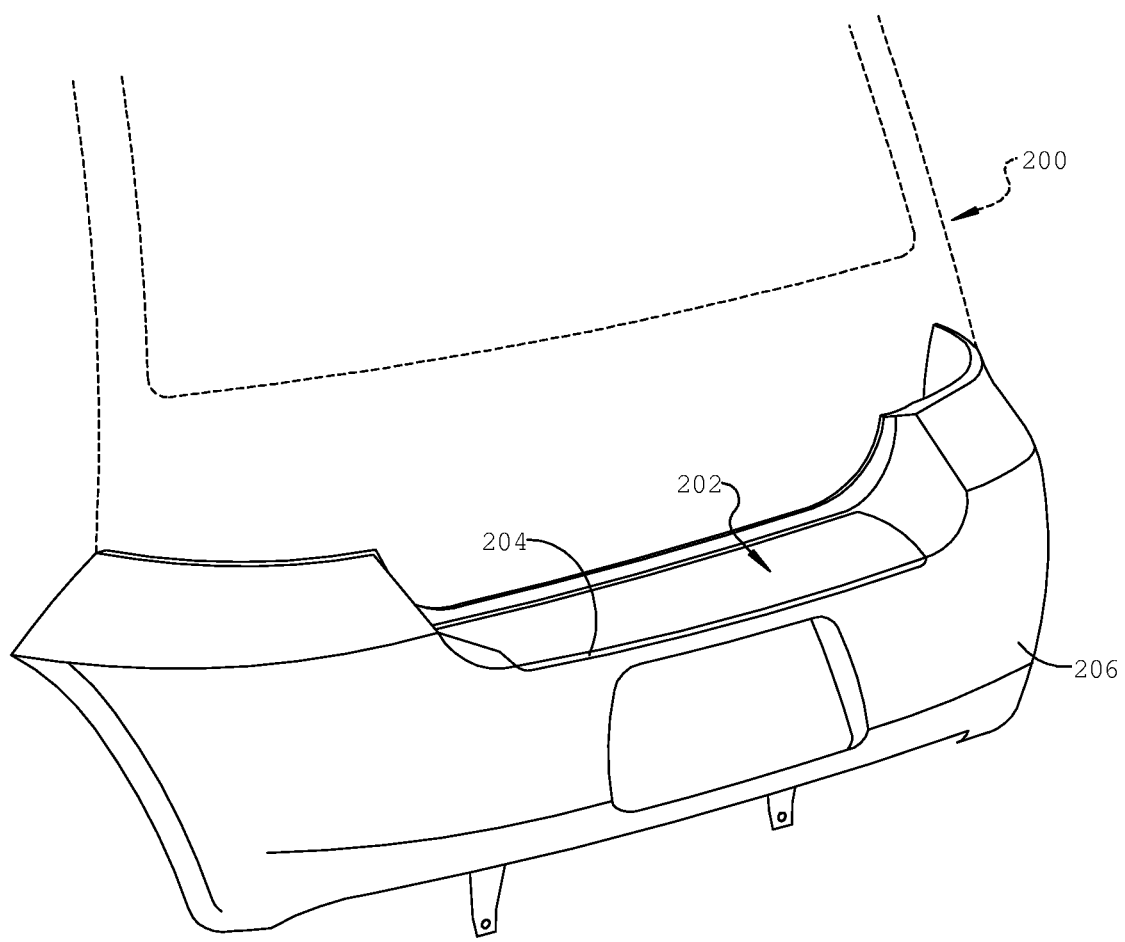
FIG. 11 is a perspective view of a rear bumper of a sport utility vehicle that incorporates a light tube in the step bumper portion of the rear bumper, in accordance with the teachings of the present disclosure.

Referring to FIG. 11, a rear step bumper portion 202 of a bumper 206 of a sport utility vehicle 200 may incorporate a light pipe 204 therein. The light pipe 204 provides a small degree of light that assists in illuminating the rear step bumper portion 202. The light pipe 204 may be controlled by a key FOB associated with the vehicle 200 or in concert with the vehicle's headlights, brake lights, daytime running lights, emergency flashers, etc.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An illuminated vehicle article carrier system for use with at least one support rail, wherein the support rail has a light pipe carried thereon for transmitting light along at least a portion of a length of the support rail to illuminate a portion of an outer body surface of the vehicle, the vehicle article carrier system comprising:
a front support foot and a rear support foot each configured to be secured to the outer body surface of the vehicle;
the support rail configured to be secured to each of the front support foot and the rear support foot;
a light emitting diode (LED) housing formed from at least somewhat resilient material, and having a cavity therein, the LED housing including a circumferential channel formed between a lip and a flange, the lip being compressible to enable insertion through an opening in the outer body surface, thus enabling, the circumferential channel of the LED housing to be captured within the opening in the outer body surface without the need for a threaded external fastening implement, after the LED housing is urged at least partially through the opening in the outer body surface;
a LED positioned within the cavity in the LED housing such that a beam of the LED is directed outwardly from the cavity, and further such that the LED is closely adjacent an exterior surface of the outer body surface when the LED housing is positioned in the opening in the outer body surface;
at least one of the front support foot and the rear support foot including a boss-like portion having a neck, the neck extending such that a terminal end thereof is axially aligned with and disposed at least closely adjacent to the cavity in the LED housing, or even to extend partially within the cavity; and
wherein the LED housing and the boss-like portion enable one end of the light pipe to be positioned in axial alignment with the cavity and in facing relationship with the LED to be in physical proximity to the LED, when the support rail and the support foot are fixedly installed on the exterior surface of the outer body surface, and without requiring a physical connection of the one end of the light pipe to the LED, such that light generated by the LED is able to be transmitted into the one end of the light pipe.

2. The vehicle article carrier system of claim 1, wherein the LED housing is made from rubber.

3. The vehicle article carrier system of claim 1, wherein the LED housing is made from plastic.

4. The vehicle article carrier system of claim 1, wherein at least one of the support feet includes an arcuate channel for supporting a section of the light pipe in a curved orientation without kinking.

5. The vehicle article carrier system of claim 4, wherein the arcuate channel communicates with an opening formed at a lower surface of the at least one of the support feet, and wherein the opening formed at the lower surface has a diameter similar to the diameter of the cavity of the LED housing.

6. The vehicle article carrier of claim 1, further comprising at least one cross bar secured to the at least one support rail.

7. An illuminated vehicle article carrier system for use with a pair of support rails, wherein each said support rail has a light pipe carried thereon for transmitting light along at least a portion of the length of the support rail to illuminate an adjacent portion of an outer body surface of the vehicle, the vehicle article carrier system comprising:
a first pair of support feet for securing a first one of the pair of support rails to the outer body surface of the vehicle;
a second pair of support feet for securing a second one of the pair of support rails to the outer body surface of the vehicle;
a cross bar adapted to be supported between the support rails for supporting articles thereon above the outer body surface of the vehicle;
a light emitting diode (LED) housing formed from resilient material defining a circumferential channel therebetween, and having an internal area defining a cavity therein, the LED housing including a lip and flange, with the lip being compressible to enable the lip to be compressed when the lip is inserted through an opening in the outer body surface, such that the circumferential channel is engaged with an edge surface of the opening, thus enabling the LED housing to be secured within the opening in the outer body surface without external fastening implements after the LED housing is pushed into the opening;
a LED positioned within the cavity of the LED housing such that the LED is closely adjacent an exterior surface of the outer body surface when the LED housing is positioned in the opening in the outer body surface, and generally centered within the opening such that the LED directs light out through the opening, and such that the LED housing does not interfere with light generated by the LED from being emitted outwardly from the LED housing through the opening in the outer body surface;
at least one of each of the first and second pairs of support feet including a boss-like portion having a neck, the neck extending such that a terminal end thereof is axially aligned with and extending at least partially into the cavity in the LED housing; and
wherein the cavity in the LED housing enables one end of the light pipe to be positioned in close proximity and in axial alignment with the LED, when an associated one of the support rails is fixedly installed on the exterior surface of the outer body surface, without requiring physical coupling of the one end of the light pipe to the LED.

8. The vehicle article carrier system of claim 7, wherein the LED housing is an integrally formed component made from one of rubber or plastic.

9. The vehicle article carrier system of claim 7, wherein the LED housing comprises a rubber grommet.

10. The vehicle article carrier system of claim 7, wherein the LED housing is adapted to be press fit into the opening of the outer body surface and held therein without the aid of external fastening implements.

* * * * *